(12) United States Patent
Uehara

(10) Patent No.: US 6,254,245 B1
(45) Date of Patent: Jul. 3, 2001

(54) BACKLIGHT FOR LIQUID CRYSTAL DISPLAYS

(75) Inventor: Hisao Uehara, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/263,760

(22) Filed: Mar. 5, 1999

(51) Int. Cl.[7] ................................ F21V 7/09; F21V 8/00
(52) U.S. Cl. .......................... 362/31; 362/302; 362/282; 362/323; 362/346; 349/65; 349/67
(58) Field of Search .................................. 349/61, 62, 64, 349/65, 67, 68; 359/592, 595, 596, 598; 362/31, 551, 559, 560, 561, 576, 302, 346, 282, 323

(56) References Cited

U.S. PATENT DOCUMENTS

| | | | |
|---|---|---|---|
| 3,966,303 | * | 6/1976 | Yamamoto ............................. 349/62 |
| 4,231,649 | * | 11/1980 | Kimura et al. ........................ 396/384 |
| 4,539,625 | * | 9/1985 | Bornstein et al. .................... 362/576 |
| 4,874,225 | * | 10/1989 | Pruszenski, Jr. ...................... 359/592 |
| 4,997,263 | * | 3/1991 | Cohen et al. ........................... 349/11 |
| 5,709,456 | * | 1/1998 | Smith et al. .......................... 362/576 |
| 5,739,876 | * | 4/1998 | Stewart .................................... 349/67 |
| 5,748,237 | * | 5/1998 | Ueda et al. ............................. 349/68 |
| 5,857,761 | * | 1/1999 | Abe et al. ............................. 362/551 |
| 5,886,759 | * | 3/1999 | Mashino et al. ........................ 349/65 |
| 6,034,750 | * | 3/2000 | Rai et al. ................................ 349/61 |

OTHER PUBLICATIONS

"Trends of Backlighting Systems Using Liquid Crystai (SIC) Display" by Tanaka, A., Monthly Display Magazine, Publication Date Jun., 1997, pp. 75–85.

* cited by examiner

*Primary Examiner*—Alan Cariaso
(74) *Attorney, Agent, or Firm*—Sheridan Ross P.C.

(57) ABSTRACT

A backlight for a liquid crystal display includes a light guide plate located adjacent to a liquid crystal display panel. A light collector is located at one end of the light guide plate and has an exposed surface for receiving ambient light. The light collector has a reflector secured inside it. The received ambient light is reflected by the reflector along the light guide plate. The reflector may include three arcuate shaped reflecting elements. The light guide plate has a reflective surface which reflects the light toward the liquid crystal display panel.

30 Claims, 9 Drawing Sheets

BACKLIGHT FOR LIQUID CRYSTAL DISPLAYS

BACKGROUND OF THE INVENTION

The present invention relates to backlights for liquid crystal displays.

A typical liquid crystal display (LCD) has a liquid crystal display panel and a backlight arranged behind the display panel. The backlight includes a light guide plate, which is located behind the display panel, an edge light, which is arranged at one end of the backlight, and a light collector, which is arranged at the other end of the backlight. The light guide plate is typically made of an acrylic. A light emitting diode (LED) or an electroluminescence (EL) may be employed as the edge light. The light collector has a lens-like shape and transmits ambient light, such as sunlight or artificial light, to the light guide plate. Examples of backlights are described in "Recent Trends in Liquid Crystal Backlights, *Monthly Display*, June 1997: 75–85."

An LCD may be applied to the view finder of, for example, a video camera or a digital still camera. In such cases, outdoor usage may incur problems. When strong sunlight shines on the display panel from behind the user on a sunny day, the amount of light transmitted to the light guide plate decreases. This may lead to a decrease in the brightness of the display panel. In some cases, the decrease in brightness can make the images on the display panel barely visible.

Accordingly, it is an objective of the present invention to provide a liquid crystal display backlight that collects ambient light efficiently.

SUMMARY OF THE INVENTION

To achieve the above objective, the present invention provides a liquid crystal display backlight comprising: a light guide plate; a light collector arranged on at least one end of the light guide plate and having an exposed surface for receiving ambient light; and a reflector arranged within the light collector.

The present invention further provides a liquid crystal display comprising: a liquid crystal display panel; a light guide plate located adjacent to the liquid crystal display panel; a light collector arranged on at least one end of the light guide plate and having an exposed surface; and a reflector arranged in the light collector.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
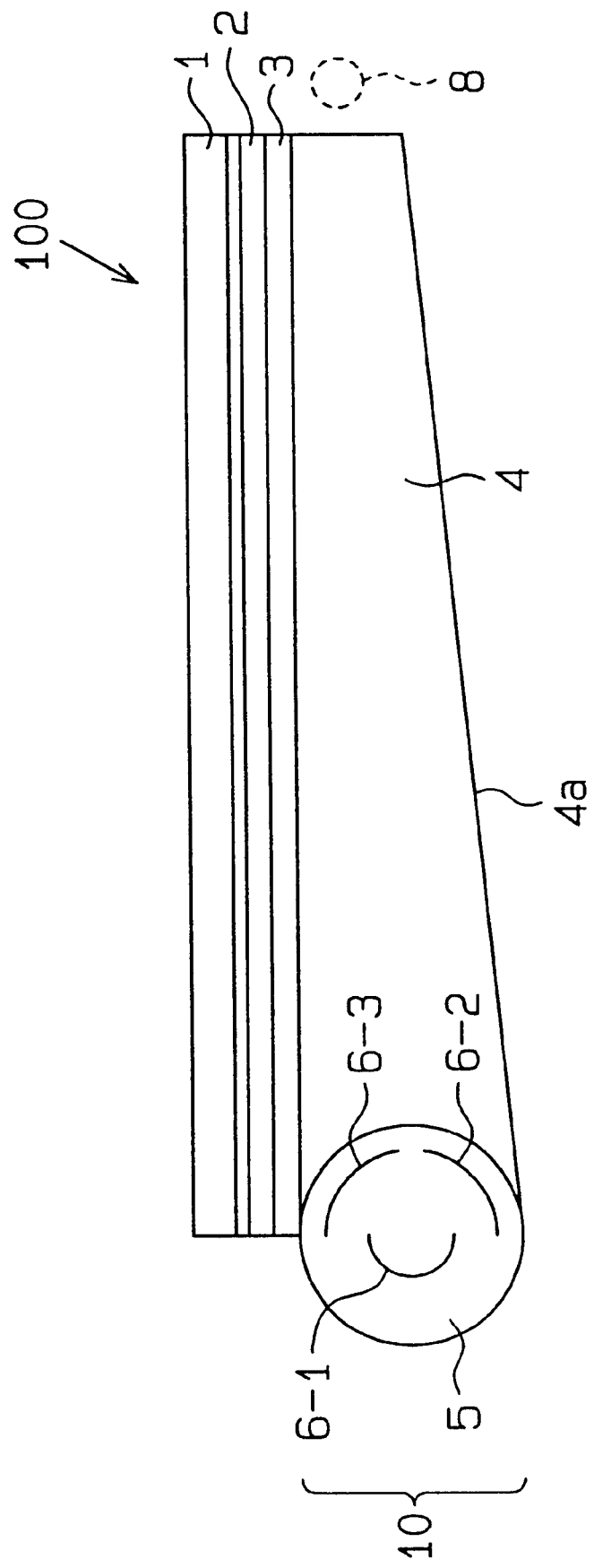
FIG. 1 is a side view showing an LCD employing a backlight according to a first embodiment of the present invention.

In the drawings, like numerals are used for like elements throughout.

First Embodiment

Figure 2:
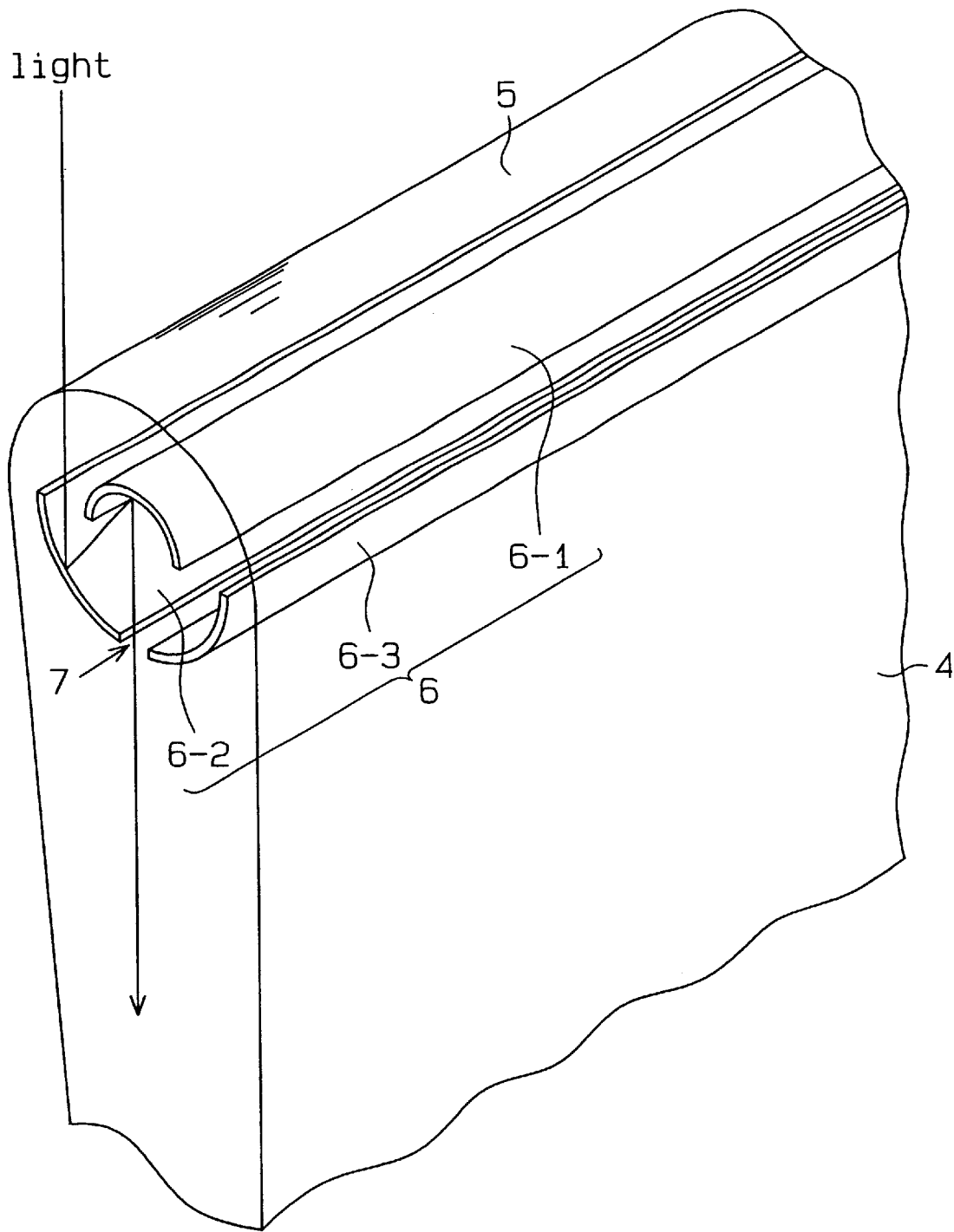
FIG. 2 is an enlarged perspective view showing the backlight of FIG. 1.

A liquid crystal display (LCD) 100 employing a backlight 10 according to a first embodiment of the present invention will now be described with reference to FIGS. 1 and 2. As shown in FIG. 1, the LCD 100 has a liquid crystal display panel 1. The LCD 100 further includes a polarizing film, or lens film 2, a diffuser 3, and the backlight 10, which are sequentially arranged behind the display panel 1.

The backlight 10 includes a light guide plate 4 arranged behind the diffuser 3, and a light collector 5, which is preferably formed integrally with the left end of the light guide plate 4. An edge light 8, which is preferably a light emitting diode (LED) or an electroluminescence (EL) element, is arranged at the right end of the light guide plate 4. The edge light 8 is used when ambient light is not collected through the light collector 5. The light guide plate 4 preferably has a V-shaped profile such that the light guide plate 4 is thinner at locations further from the light collector 5. However, the light guide plate 4 may also be rectangular. One side of the light guide plate 4 faces the diffuser 3. The other side of the light guide plate 4 is molded or printed so that it has a diffusing reflection surface 4a. Preferably, silk screen printing is performed by forcing ink through the pores of a meshed fabric and onto a printing subject. In comparison to offset printing, which could also be used, silk screen printing forms a diffusing reflection surface 4a (i.e., ink layer) having a thickness that is five to ten times greater. The silk screened diffusing reflection surface 4a is believed to have superior weather resistance and chemical resistance properties.

The light collector 5 preferably has a profile similar to a convex lens to guide ambient light, such as sunlight or artificial light, toward the light guide plate 4. Furthermore, the light collector 5 is made of a material having high transparency, such as an acrylic, glass, or polycarbonate. A reflector 6, which preferably includes three reflecting elements 6-1, 6-2, 6-3, is arranged within the light collector 5. The number of the reflecting elements 6-1, 6-2, 6-3 may be changed. The reflecting elements 6-1, 6-2, 6-3 are preferably made of a material having high reflectance, such as aluminum, which also has desired molding properties. The reflecting elements 6-1, 6-2, 6-3 extend in the longitudinal direction of the light collector 5 (perpendicular to the plane of FIG. 1).

The reflecting elements 6-1, 6-2, 6-3 will now be described with reference to FIG. 2. The reflecting elements 6-1, 6-2, 6-3 are arranged such that the light collected by the light collector 5 is transmitted toward the light guide plate 4.

More specifically, the reflecting elements 6-1, 6-2, 6-3 are arranged such that the ambient light reflected by the reflecting elements 6-2, 6-3 are collected by the reflecting element 6-1.

The reflecting elements 6-1, 6-2, 6-3 are embedded in the light collector 5 and molded or silk screen printed to define reflection surfaces. Further, the reflecting elements 6-1, 6-2, 6-3 are formed preferably through insert molding, press fitting, or deposition. When performing insert molding, the reflector 6 is positioned in a mold. Liquefied resin is then poured into the mold and solidified. It is preferable that the light collector 5 be made of an acrylic when carrying out insert molding. Insert molding is most preferable since the reflecting elements 6-1, 6-2, 6-3 can be formed thin and at low cost. When performing press fitting, the reflecting elements 6-1, 6-2, 6-3 are heated. The heated reflecting elements 6-1, 6-2, 6-3 are then pressed against the acrylic light collector 5. This melts the light collector 5 and embeds the reflecting elements 6-1, 6-2, 6-3 longitudinally in the light collector 5. When performing deposition, metal is deposited into notches having the same shape as the reflecting elements 6-1, 6-2, 6-3 to form the reflecting elements 6-1, 6-2, 6-3. Alternatively, preformed reflecting elements 6-1, 6-2, 6-3 may be inserted into the notches.

Each reflecting element 6-1, 6-2, 6-3 has a parabolic profile. A gap 7 extends between the reflecting elements 6-2, 6-3. The reflecting surfaces of the reflecting elements 6-2, 6-3 face the exterior of the light collector 5. The reflecting element 6-1 is arranged between the reflecting elements 6-2, 6-3 such that its reflecting surface faces the gap 7.

Incident light in the light collector 5 is reflected by the reflecting elements 6-2, 6-3 and collected by the reflecting element 6-1. The reflecting element 6-1 reflects the collected light into the light guide plate 4 through the gap 7. The light is collimated when passing through the gap 7. The diffusing reflection surface 4a then illuminates the display panel 1 from behind. Accordingly, ambient light is efficiently transmitted to the light guide plate 4. Thus, images can be viewed on the display panel 1 even if the display panel 1 is subjected to sunlight from behind the user on a sunny day.

Second Embodiment

Figure 3:
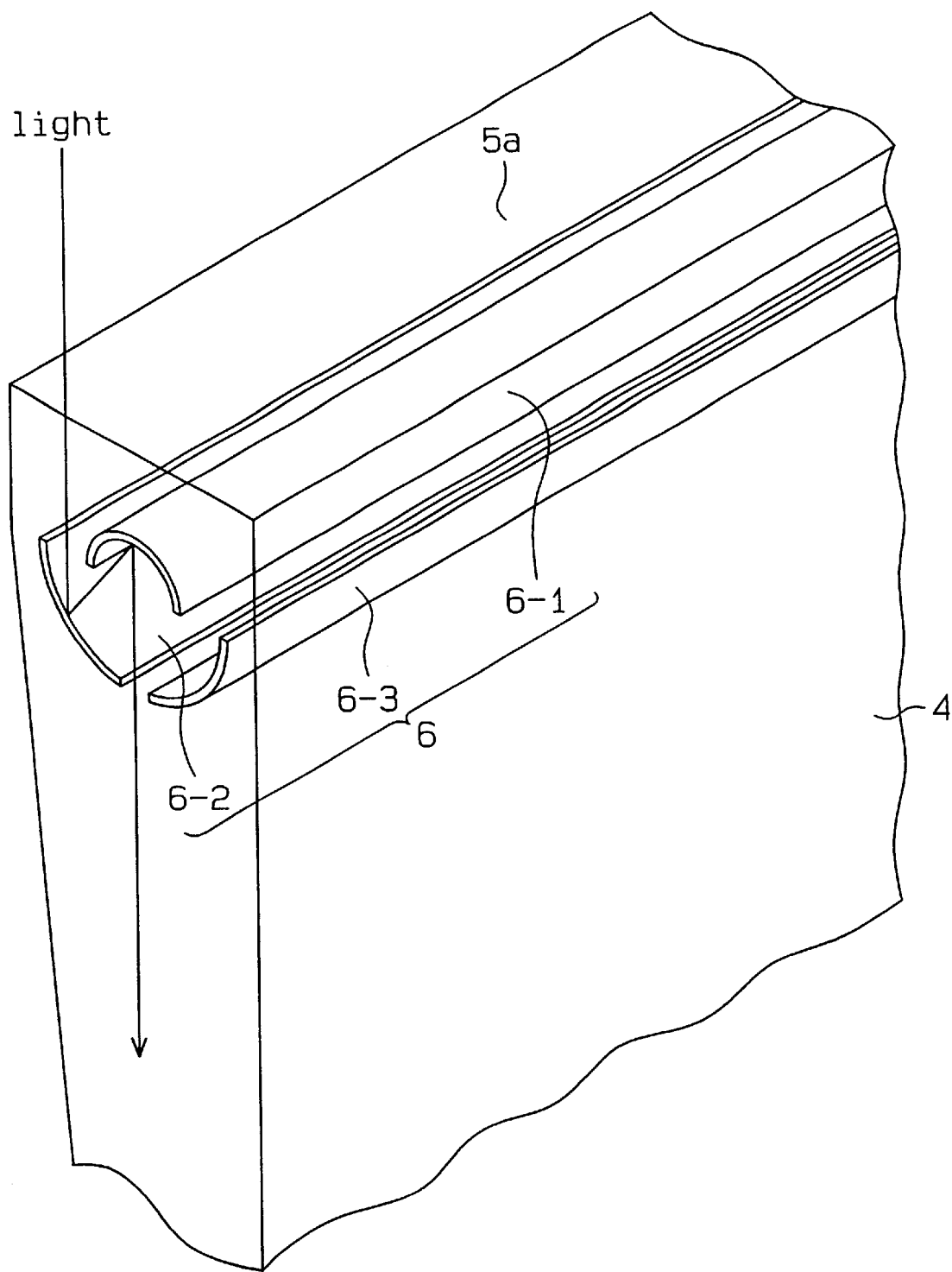
FIG. 3 is a perspective view showing a backlight according to a second embodiment of the present invention.

A second embodiment according to the present invention will now be described with reference to FIG. 3. The second embodiment is a modification of the first embodiment. As shown in FIG. 3, a light collector 5a may have a flat outer side surface (light collecting surface), as opposed to the curved rim of the first embodiment shown in FIG. 2.

Third Embodiment

Figure 4:
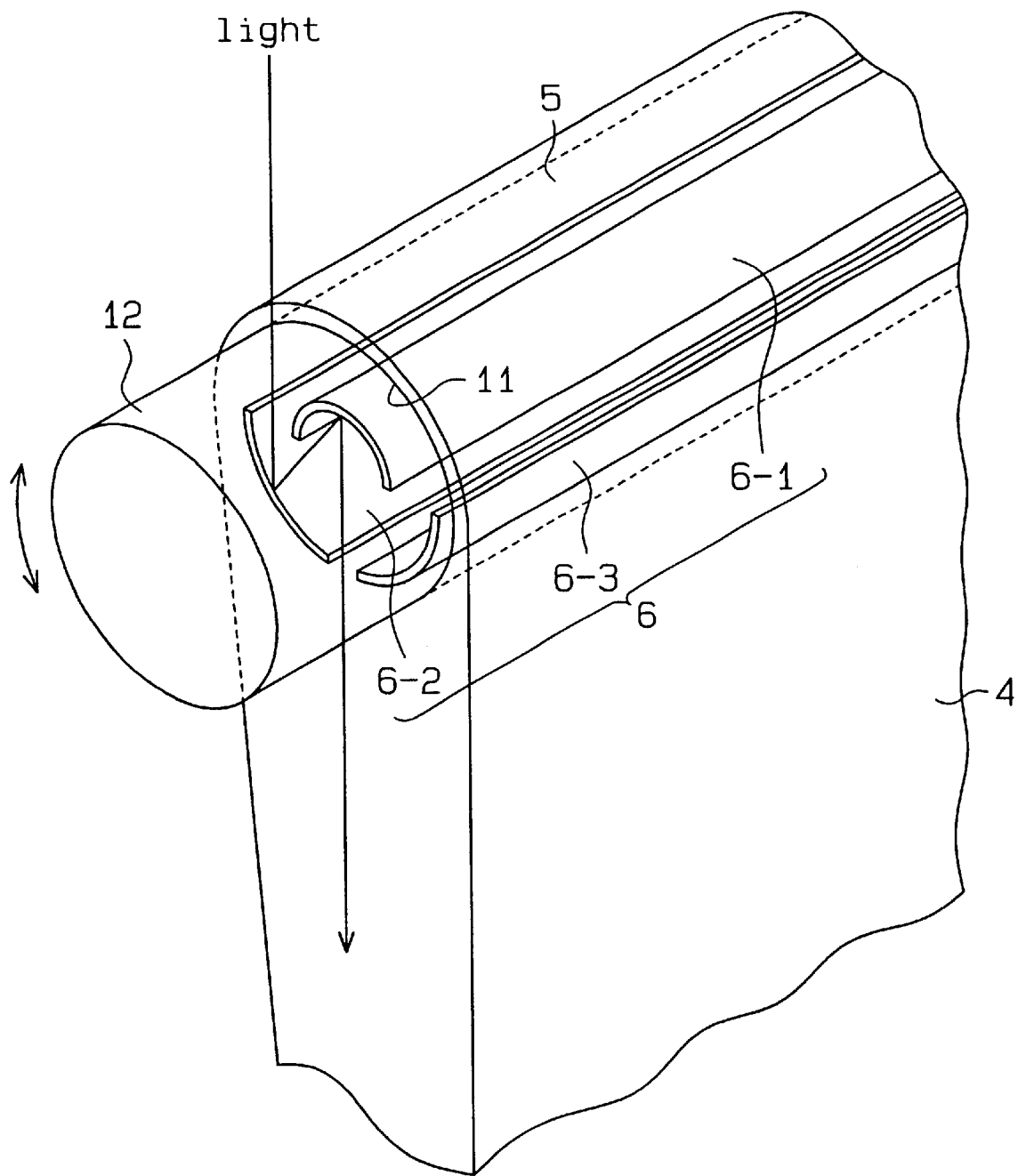
FIG. 4 is a perspective view showing a backlight according to a third embodiment of the present invention.
Figure 5:
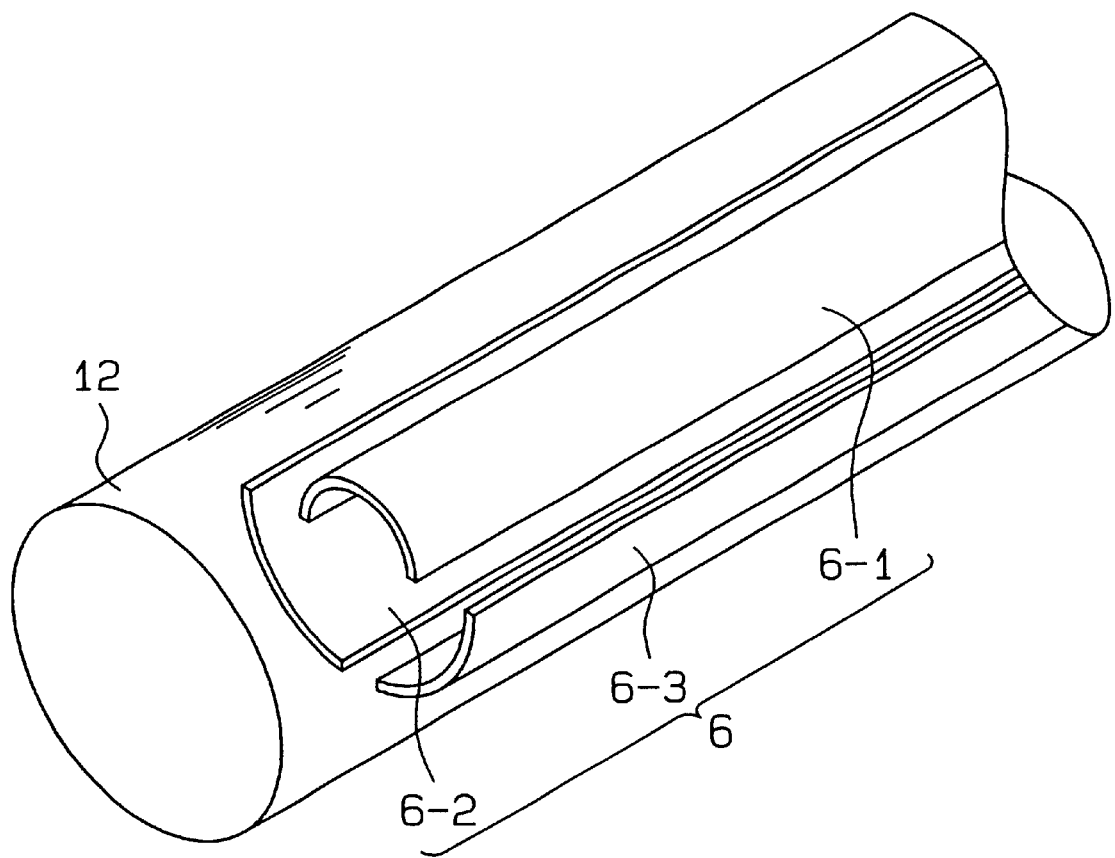
FIG. 5 is a perspective view showing a reflector of the backlight of FIG. 4.

A third embodiment according to the present invention will now be described with reference to FIGS. 4 and 5. In this embodiment, the reflecting elements 6-1, 6-2, 6-3 are rotatable. The light collector 5 has a convex lens-like shape and includes a bore 11, which extends longitudinally. A cylinder 12 is accommodated in the bore 11. The reflecting elements 6-1, 6-2, 6-3 are preferably secured to the inner surface of the cylinder 12. The positional relationship of the reflecting elements 6-1, 6-2, 6-3 is the same as the reflecting elements 6-1, 6-2, 6-3 of the first embodiment. The cylinder 12 is formed independently from the light guide plate 4 and is preferably formed from a transparent material, which may be the same type of material as the light guide plate 4. The cylinder 12 is rotated manually to adjust the position of the reflecting elements 6-1, 6-2, 6-3 to maximize or optimize the amount of light transmitted to the light guide plate 4.

Fourth Embodiment

Figure 6:
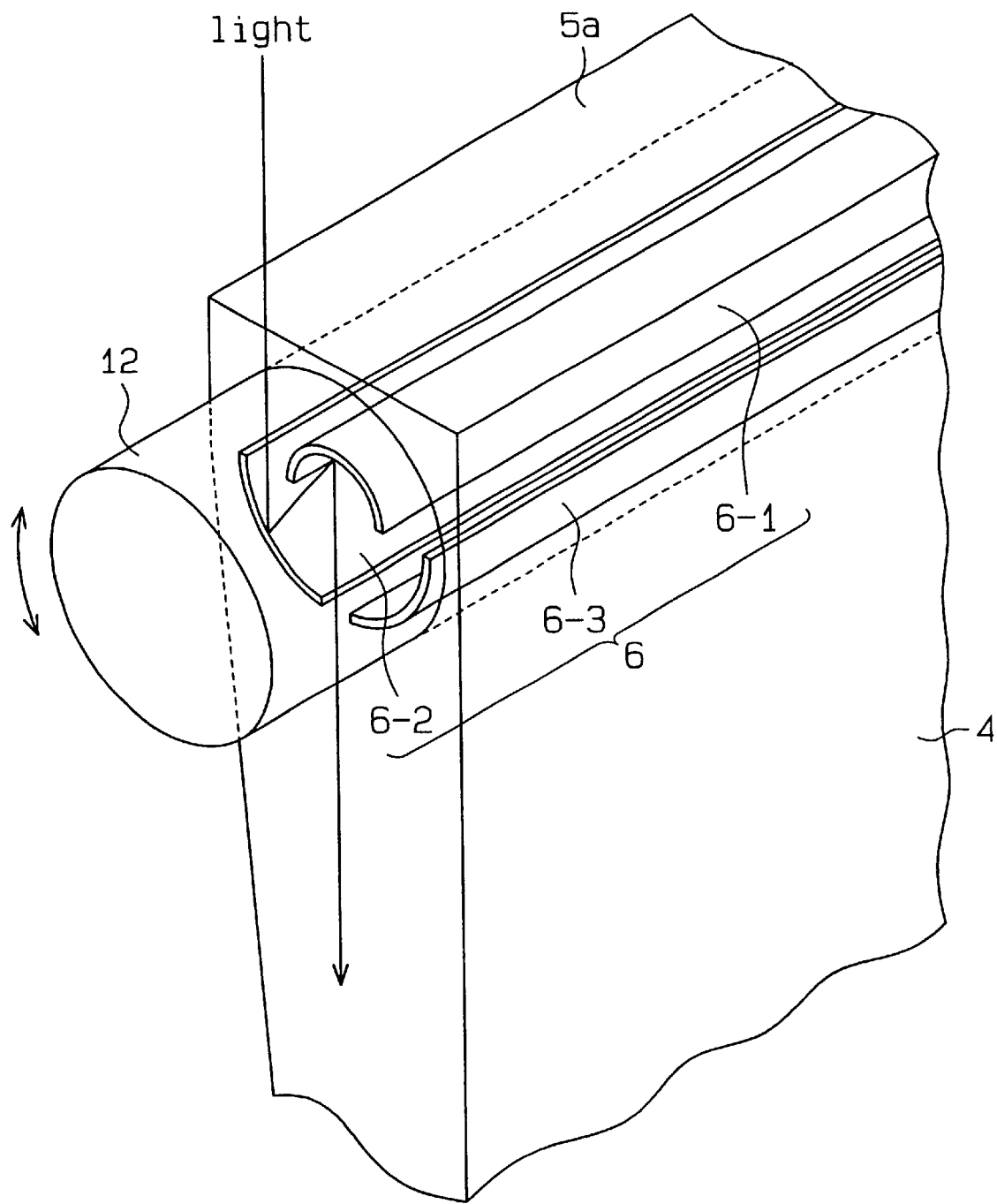
FIG. 6 is a perspective view showing a backlight according to a fourth embodiment of the present invention.

A fourth embodiment according to the present invention will now be described with reference to FIG. 6. The fourth embodiment is a modification of the embodiment illustrated in FIG. 5. As shown in FIG. 6, a light collector 5a may have a flat rim (light collecting surface). Thus, the forth embodiment is a combination of the second and third embodiments.

Fifth Embodiment

Figure 7:
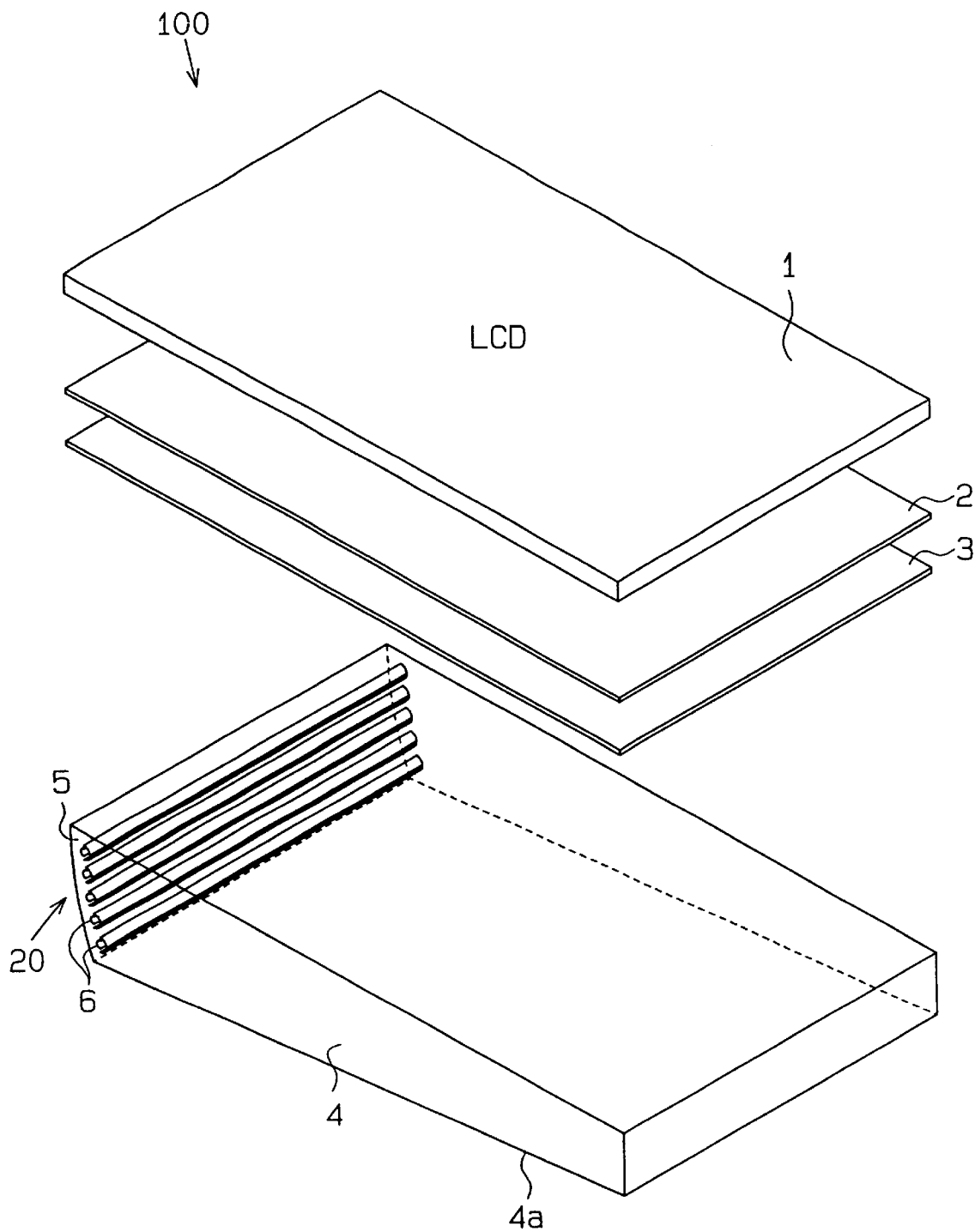
FIG. 7 is an exploded perspective view showing an LCD employing a backlight according to a fifth embodiment of the present invention.
Figure 8:
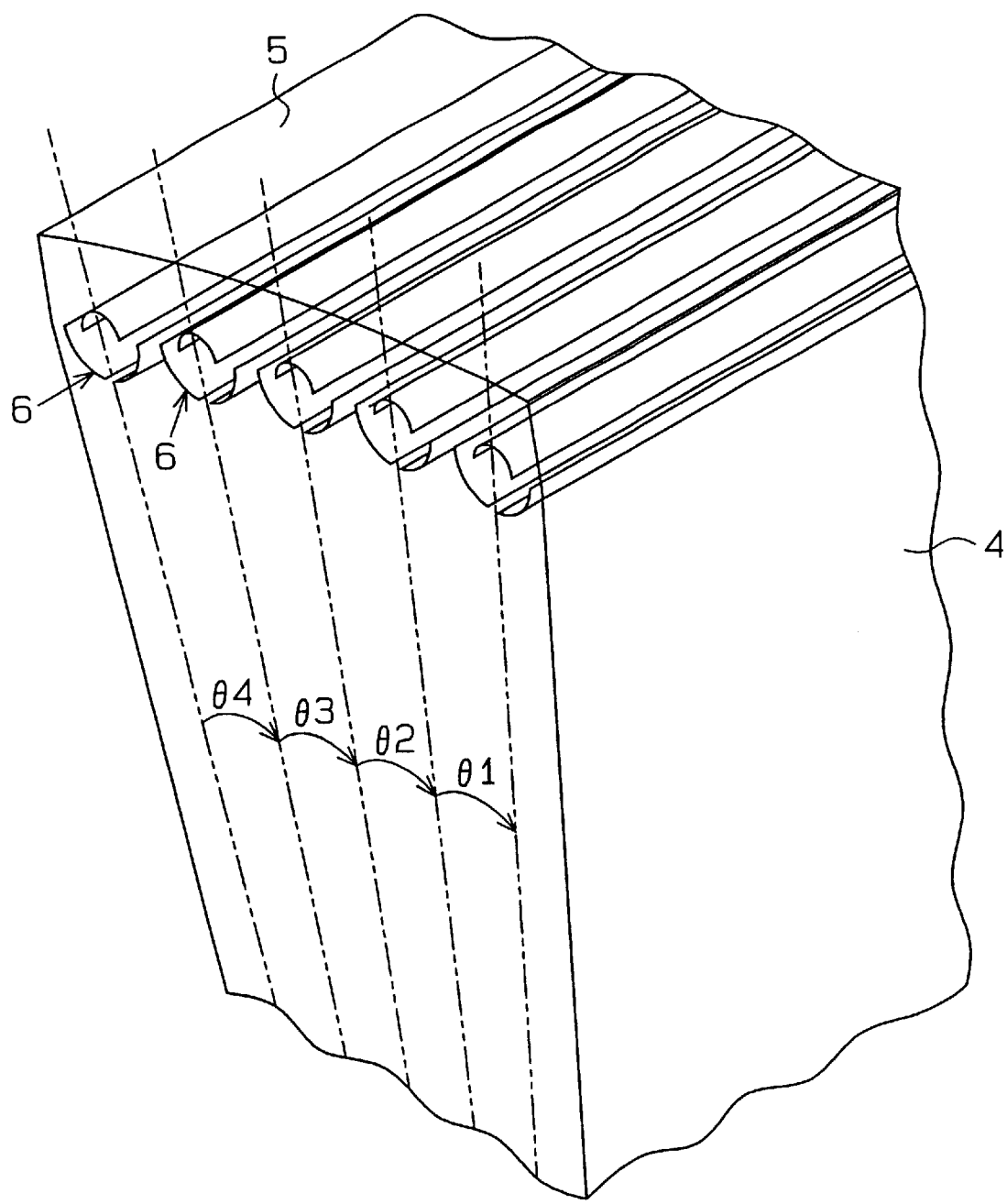
FIG. 8 is an enlarged perspective view showing the backlight of FIG. 7.

As shown in FIG. 7, in a fifth embodiment of the present invention, a backlight 20 has a plurality of reflectors 6 (five shown). Each reflector 6 preferably includes three reflecting elements 6-1, 6-2, 6-3 like the above embodiments. More specifically, as shown in FIG. 8, a plurality of reflectors 6 are arranged longitudinally along the light collector 5. The reflectors 6 are preferably spaced from one another at equal intervals ($\theta 1=\theta 2=\theta 3=\theta 4$) along the rim of the light collector 5 in a direction substantially perpendicular to the longitudinal direction. Each reflector 6 may be rotatable like the reflector 6 of the third embodiment.

Sixth Embodiment

Figure 9:
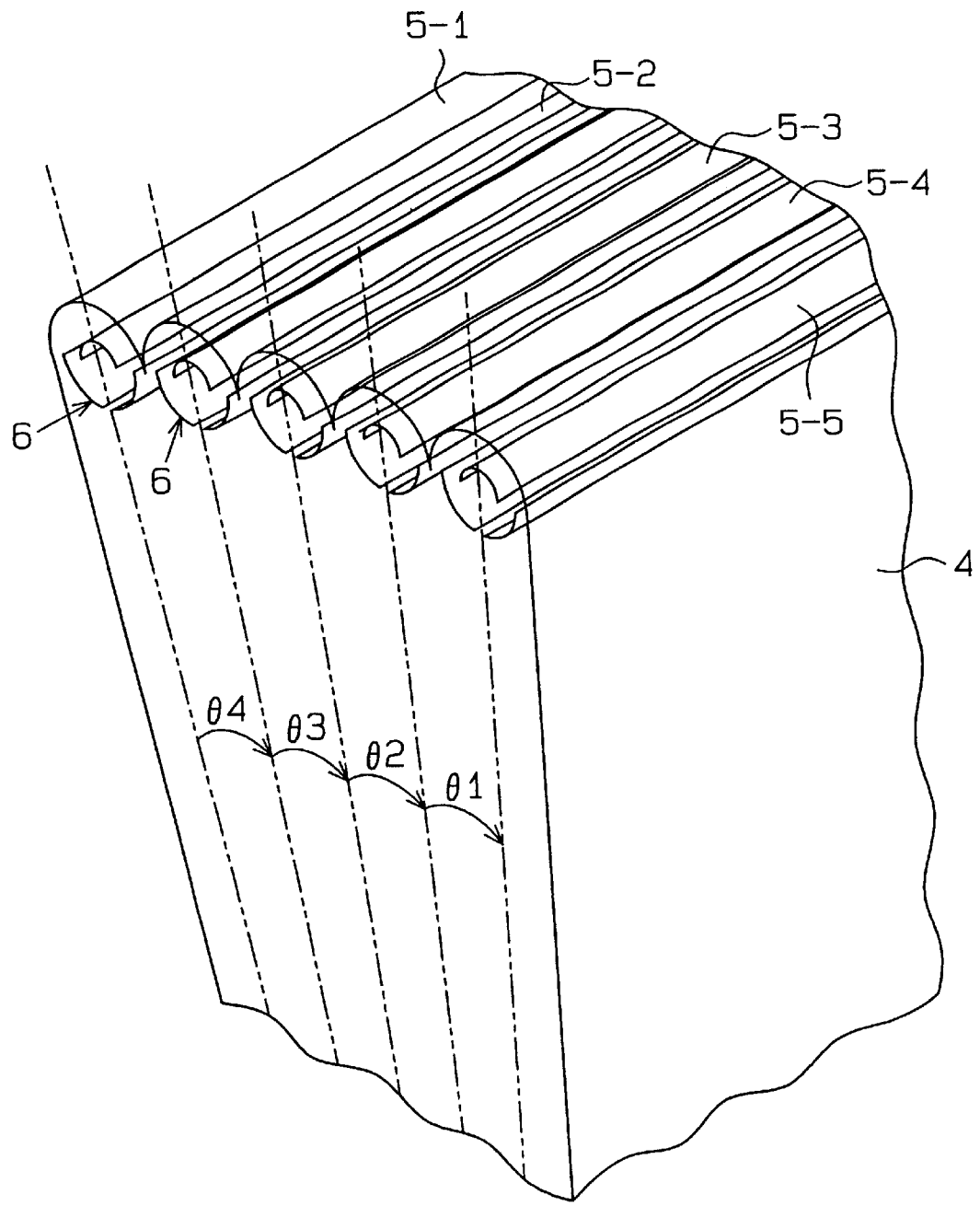
FIG. 9 is a perspective view showing a backlight according to a sixth embodiment of the present invention.

A sixth embodiment of the present invention will now be described with reference to FIG. 9. The backlight 20 illustrated in FIGS. 7 and 8 is modified in this embodiment. As shown in FIG. 9, each reflector 6 is associated with a light collector 5-1, 5-2, 5-3, 5-4, 5-5. Each light collector 5-1, 5-2, 5-3, 5-4, 5-5 has a convex lens-like shape.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A backlight for irradiating light to a liquid crystal display panel comprising:

a light guide plate;

a light collector arranged on at least one end of the light guide plate and having an exposed surface for receiving ambient light; and a reflector arranged within the light collector to reflect the ambient light and transmit the reflected light along the light guide plate and to the liquid crystal display panel, wherein the reflector includes a first reflecting element and a-second reflecting element, and the second reflecting element reflects the ambient light toward the first reflecting element, and wherein the first reflecting element further reflects the reflected light from the second reflecting element toward the light guide plate.

2. The backlight according to claim 1, wherein the reflector includes a plurality of reflectors generally equally spaced from each other substantially perpendicular to a longitudinal direction of the light collector and extending along the longitudinal direction, and wherein each of the reflectors include the first reflecting element and the second reflecting element.

3. The backlight according to claim 2, wherein the light collector has a convex lens-like surface.

4. The backlight according to claim 1, wherein the reflector further includes a third reflecting element arranged adjacent to the second reflecting element to collimate the ambient light collected by the light collector toward the first reflecting element, and a gap extending between the second and third reflecting elements, the first reflecting element arranged at a position corresponding to the gap so that light is reflected from the first reflecting element through the gap.

5. The backlight according to claim 1, wherein the reflector has a parabolic reflecting surface.

6. The backlight according to claim 1, wherein the light collector has a longitudinally extending bore, and a rotatable cylinder accommodated in the bore, the reflector being secured to an inner surface of the cylinder.

7. The backlight according to claim 1, wherein the light collector has a convex lens-like surface.

8. The backlight according to claim 1, wherein the light collector has a flat surface.

9. The backlight according to claim 1, further comprising a light source arranged on an end of the light guide plate opposite to the end on which the light collector is arranged.

10. The backlight according to claim 1, wherein the light guide plate is thinner at positions farther from, the light collector.

11. The backlight according to claim 1, wherein the light guide plate has a wall defining a reflection surface.

12. A liquid crystal display comprising:
 a liquid crystal display panel;
 a light guide plate located adjacent to the liquid crystal display panel;
 a light collector arranged on at least one end of the light guide plate and having an exposed surface to receive ambient light; and
 a reflector arranged in the light collector to reflect the ambient light and transmit the reflected light toward the light guide plate, wherein the reflector includes a first reflecting element and a second reflecting element, the second reflecting element reflects the ambient light toward the first reflecting element, and the first reflecting element further reflects the reflected light from the second reflecting element toward the light guide plate.

13. A liquid crystal display comprising:
 a liquid crystal display panel;
 a light guide plate located adjacent to the liquid crystal display panel;
 a light collector arranged on at least one end of the light guide plate and having an exposed surface;
 a reflector arranged in the light collector to reflect the ambient light and transmit the reflected light toward the light guide plate, wherein the reflector includes a first reflecting element and a second reflecting element, the second reflecting element reflects the ambient light toward the first reflecting element, and the first reflecting element further reflects the reflected light from the second reflecting element toward the light guide plate; and
 a lens film and a diffuser arranged between the light guide plate and the liquid crystal display panel.

14. The liquid crystal display according to claim 12, wherein the light guide plate has a wall defining a reflection surface.

15. A backlight for irradiating light to a liquid crystal display panel comprising:
 a light guide plate arranged behind the liquid crystal display panel;
 a light collector arranged on at least one end of the light guide plate and having an exposed surface for receiving ambient light; and
 a reflector arranged within the light collector to reflect the ambient light such that the reflected light is irradiated to the at least one end of the light guide plate and the reflected light is transmitted along the light guide plate, wherein the reflector has a parabolic reflecting surface.

16. The backlight according to claim 15, wherein the reflector includes a first reflecting element and a second reflecting element, the second reflecting element arranged to collimate the ambient light collected by the light collector toward the first reflecting element, the first reflecting element further reflecting the reflected light from the second reflecting element along the light guide plate.

17. The backlight according to claim 16, wherein the reflector includes a plurality of reflectors generally equally spaced from each other substantially perpendicular to a longitudinal direction of the light collector and extending along the longitudinal direction, and wherein each reflector includes the first reflecting element and the second reflecting element.

18. The backlight according to claim 16, wherein the reflector further includes a third reflecting element arranged adjacent to the second reflecting element to collimate the ambient light collected by the light collector toward the first reflecting element, and a gap extending between the second and third reflecting elements, the first reflecting element arranged at a position corresponding to the gap so that light is reflected from the first reflecting element through the gap.

19. The backlight according to claim 15, further comprising a light source arranged on an end of the light guide plate opposite to the end on which the light collector is arranged.

20. The backlight according to claim 15, wherein the light guide plate is thinner at positions farther from the light collector.

21. The backlight according to claim 15, further comprising a lens film and a diffuser arranged between the light guide plate and the liquid crystal display panel.

22. The backlight according to claim 15, wherein the light guide plate has a wall defining a reflection surface.

23. A backlight for irradiating light to a liquid crystal display panel comprising:
 a light guide plate;
 a light collector arranged on at least one and of the light guide plate and having an exposed surface for receiving ambient light; and
 a reflector arranged within the light collector to reflect the ambient light and transmit the reflected light along the light guide plate, wherein the light collector has a longitudinally extending bore and a rotatable cylinder accommodated in the bore, the reflector being secured to an inner surface of the cylinder.

24. The backlight according to claim 23, wherein the reflector includes a first reflecting element and a second reflecting element, the second reflecting element arranged to collimate the ambient light collected by the light collector toward the first reflecting element, the first reflecting element further reflecting the reflected light from the second reflecting element along the light guide plate.

25. The backlight according to claim 24, wherein the reflector includes a plurality of reflectors, each reflector including a first reflecting element and a second reflecting element.

26. The backlight according to claim 24, wherein the reflector further includes a third reflecting element arranged adjacent to the second reflecting element to collimate the ambient light collected by the light collector toward the first reflecting element, and a gap extending between the second and third reflecting elements, the first reflecting element arranged at a position corresponding to the gap so that light is reflected from the first reflecting element through the gap.

27. The backlight according to claim 23, further comprising a light source arranged on an end of the light guide plate opposite to the end on which the light collector is arranged.

28. The backlight according to claim 27, wherein the light guide plate is thinner at positions farther from the light collector.

29. The backlight according to claim 23, further comprising a lens film and a diffuser arranged between the light guide plate and the liquid crystal display panel.

30. The backlight according to claim 23, wherein the light guide plate has a wall defining a reflection.

* * * * *